(12) United States Patent
Choi

(10) Patent No.: US 6,618,597 B1
(45) Date of Patent: Sep. 9, 2003

(54) INCREASING CELL CAPACITY BY GAIN CONTROL OF TRAFFIC CHANNELS

(75) Inventor: Yong Su Choi, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/372,203

(22) Filed: Aug. 11, 1999

(30) Foreign Application Priority Data

Aug. 13, 1998 (KR) ............................................. 11-32919

(51) Int. Cl.[7] ................................................ H04B 7/00
(52) U.S. Cl. ...................... 455/522; 455/453; 455/522
(58) Field of Search ................................ 455/450, 453, 455/561, 522, 69, 436, 438; 370/320, 335, 342, 468, 465, 200, 328, 318, 332, 333

(56) References Cited

U.S. PATENT DOCUMENTS

| | | | | |
|---|---|---|---|---|
| 5,475,861 A | * | 12/1995 | Hall | 455/33.1 |
| 5,722,044 A | * | 2/1998 | Padovani et al. | 455/443 |
| 5,768,684 A | * | 6/1998 | Grubb et al. | 455/13.4 |
| 5,878,350 A | * | 3/1999 | Nakamura et al. | 455/442 |
| 5,884,187 A | * | 3/1999 | Ziv et al. | 455/522 |
| 6,034,971 A | * | 3/2000 | Love et al. | 370/468 |
| 6,128,500 A | * | 10/2000 | Raghavan et al. | 455/453 |
| 6,160,999 A | * | 12/2000 | Chheda et al. | 455/69 |
| 6,278,882 B1 | * | 8/2001 | Choi | 455/453 |
| 6,285,664 B1 | * | 9/2001 | Bernstein et al. | 370/318 |

FOREIGN PATENT DOCUMENTS

| | | | | |
|---|---|---|---|---|
| DE | 0615395 A | * | 9/1994 | H04Q/7/04 |
| FI | WO 96/37082 | * | 11/1996 | |
| FI | WO 97/08909 | * | 3/1997 | H04Q/7/36 |

* cited by examiner

*Primary Examiner*—Edward F. Urban
*Assistant Examiner*—Charles Chow
(74) *Attorney, Agent, or Firm*—Fleshner & Kim, LLP

(57) ABSTRACT

A method of increasing a cell capacity in a mobile communication system is disclosed. In the present invention, the cell capacity is increased by a gain control of traffic channels in a CDMA mobile communication system which can secure the cell capacity and increase the whole cell capacity by lowering the powers of the traffic channels allocated to a cell to a predetermined level. Thus, even when a call allocation is abnormal due to a decrease of forward exess capacity value, the present invention allows an allocation of normal and handoff calls.

28 Claims, 3 Drawing Sheets

INCREASING CELL CAPACITY BY GAIN CONTROL OF TRAFFIC CHANNELS

BACKGROUND OF THE INVENTION

1. Field of the Invention

The present invention relates to a code division multiple access mobile radio communication system and more particularly to increase a cell capacity in a code division multiple access mobile radio communication system. The present invention increases a cell capacity utilizing a gain control of traffic channels by lowering the powers of the traffic channels allocated to a cell to a predetermined level.

2. Description of the Related Art

A maximum forward sector capacity is the maximum capacity at which an adequate quality of speech can be maintained while processing signals for both incoming and outgoing calls. If the load on a sector exceeds the maximum forward sector capacity, the pilot channels allocated in the sector may disappear due to the traffic channels. Moreover, the frame error ratio of the forward sector would increase resulting in a deterioration of the speech quality and/or a disconnection of a call.

The load on the sector which affects the forward sector capacity increases and decreases depending upon the number of calls allocated, speech activity forward traffic channel gains, forward power control subchannel gains, etc. In mobile communication systems, three sectors typically constitute one cell. Accordingly, a forward sector capacity control and a high-power amplifier overload control methods are well known cell capacity control techniques in the related art.

The sector capacity control method controls a sector capacity based upon the number of activated calls being served in the sector. In the sector capacity control method, a service limit threshold value is determined by an experiment in consideration of a sector output, propagation environments, and other factors as determined by the system manager. The service limit threshold value designates the maximum number of calls which can be allocated in the sector. Thus, the total number of calls being served in a sector is compared with the service limit threshold value, and whether to allocate more calls is determined based upon the result of the comparison.

However, sectors have different propagation environments resulting in a different number of calls which can be served in a sector. As a result, the service limit threshold values obtained based upon sector output and propagation environments cannot be reliable for every sector. Thus, the sector capacity control method, based upon the number of activated calls, may sometimes produce an inefficient cell capacity control.

In the high-power amplifier overload control method, the service limit threshold value is determined in consideration of the maximum output of a high-power amplifier which is an output amplifier of the base station. The effective radiated power of the sector at the final output terminal, constantly monitored in the base station, is compared with the service limit threshold value. Then, new calls and handoffs are allowed or limited based upon the result of the comparison.

However, the purpose of the high-power amplifier overload control method is to protect the high-power amplifier rather than to control the sector capacity. Because factors such as the speech quality of a sector, the intensity of the pilot signal, the abnormal release of call caused by an increase of the sector capacity are not considered, the sector capacity may be in saturation before the high-power amplifier becomes overloaded.

Therefore, according to conventional cell capacity control methods as described above, the decrease of the sector capacity due to an increase of subscribers may cause a significant deterioration of the speech quality of a sector. In the worst case, the pilot signal of the sector may disappear and thus the sector may lapse into an unserviceable state.

To improve the reliability of the communication system, a sector capacity control method based upon a call process has been proposed. FIG. 1 shows a block diagram of a base station which performs such a call processing method for the sector capacity control.

The base station of FIG. 1 includes a modular selector/vocoder card (SVC) 1 processing voice data and allocating forward traffic channel powers; a plurality of traffic channel elements 2~4; and a base station processor (BSP) 5. The SVC 1 allocates traffic channel powers to the plurality of traffic channel elements 2~4 and the traffic channel elements 2~4 report the respective power allocation to the BSP 5. The BSP 5 calculates the forward powers of the respective sectors utilizing the traffic channel powers reported by the traffic channel elements 2~4 and controls its own sector capacity.

FIG. 2 is a flowchart illustrating the call processing method for the sector capacity control, performed by the base station of FIG. 1. First, the forward sector exess capacity value is determined by a ratio of the pilot channel power to the total forward channel power. Then, a call service limit threshold value and a handoff limit threshold value, which are the service limit threshold values, are calculated based on the forward sector exess capacity value.

Particularly, a forward sector exess capacity value at which a maximum number of calls can be serviced while maintaining both a uniform speech quality and powers reserved for handoffs is calculated as the call service limit threshold value. The call service in a sector may be limited due to the call service threshold value, but handoff requests from an adjacent sector can be allowed until the forward sector exess capacity value becomes smaller than the handoff limit threshold value.

Thus, the handoff limit threshold value is smaller than the call service limit threshold value. Also, the fact that the forward sector exess capacity value is equal to or smaller than the handoff limit threshold value means that a sector is currently at the maximum capacity to service normal and handoff calls. The call service limit threshold value and the handoff limit threshold value can be more accurately determined by repeated experiments.

Referring to FIG. 2, a judgement is made whether a service request received from a mobile switching center (MSC) or a mobile station is for a normal call, i.e. origination/terminating or outgoing/incoming call, respectively (S1). If the request is for a normal call, a judgement is made whether to limit the call by comparing the call service limit threshold value with the forward sector exess capacity value (S2). If the request is not for a normal call, the request would be for a handoff and a judgement is made whether to limit the handoff by comparing the handoff limit threshold value with the forward sector exess capacity value (S3).

According to the result of comparison in step S2, the request for normal call is accepted and allocated (S4) or the request is refused (S6). Similarly, according to the result of comparison in step S3, the request for handoff is accepted and allocated (S5) or the request is refused (S7). The call control method estimates the forward power of a sector by utilizing the powers of activated traffic channels allocated to the sector while the base station processes incoming and outgoing calls. As a result, the call control method maintains the forward load of a sector below a predetermined level even if the forward sector capacity is overloaded.

Although the call control method can maintain a uniform speech quality with respect to calls being served in a sector and prevent the decrease of pilot channel power due to the increase of forward power, it still limits the call service requests received after the generation of overload. Thus the method cannot increase a sector capacity. Also, in limiting the calls to maintain the sector capacity, mobile stations in a sector may appear to be in a serviceable state, but may actually be in a state when normal calls and/or the handoff calls cannot be served, thereby causing user inconvenience.

SUMMARY OF THE INVENTION

Accordingly, an object of the present invention is to solve at least the problems and disadvantages of the related art.

An object of the present invention is to allow a more efficient allocation of call requests received in a base station.

Another object of the present invention is to increase a cell capacity. More specifically, an object of the present invention is to increase a cell capacity by a gain control of traffic channels. A cell capacity is increased by lowering the powers of all traffic channels allocated to the cell to a predetermined level.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a cell capacity increasing method according to the present invention includes comparing a forward exess capacity value, determined by a ratio of a pilot channel power to the total whole forward channel power, with a sum value of a gain control threshold value and a threshold control value when a normal call is requested in a base station; comparing the forward exess capacity value with the gain control threshold value if it is judged that the forward exess capacity value is smaller than the sum value; and controlling a traffic channel gain by reducing channel powers of traffic channel elements by a predetermined gain control value if it is judged that the forward exess capacity value is smaller than the gain control threshold value.

The forward exess capacity value is determined by an operator of the base station in consideration of the traffic channel elements to which the channel powers are allocated for signal transmission.

Preferably, if the forward exess capacity value is larger than the sum value and the traffic channel elements are already in a gain-controlled state, the gain control to reduce the channel powers of the traffic channel elements is stopped and the gain-controlled state is released. On the other hand, if the forward exess capacity value is larger than the gain control threshold value, the forward exess capacity value is re-calculated and compared with the sum value to repeat the cell capacity increasing process.

Also, after a base station enters a gain-controlled status, it is successively judged whether the forward channel powers are reduced due to a release of incoming or outgoing call requests in the base station. Depending upon the result, the forward exess capacity value is re-calculated and compared with the sum value to repeat the cell capacity i n creasing process.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENT

Reference will now be made in detail to the preferred embodiment of the present invention, examples of which are illustrated in the accompanying drawings.

Similar to the call processing method for the cell capacity control, the base station for performing the traffic channel gain control method according to the present invention includes a modular selector/vocoder card (SVC), a plurality of traffic channel elements (TCE), and a base station processor (BSP). The SVC processes voice data and allocates forward traffic channel powers. The plurality of TCE transmits a voice and signal process messages using the allocated traffic channel powers, and performs the gain control of the traffic channel powers. The BSP calculates the forward exess capacity value of a sector, compares the forward exess capacity value with a gain control threshold value, and determines whether to perform the gain control of the traffic channels.

Figure 1:
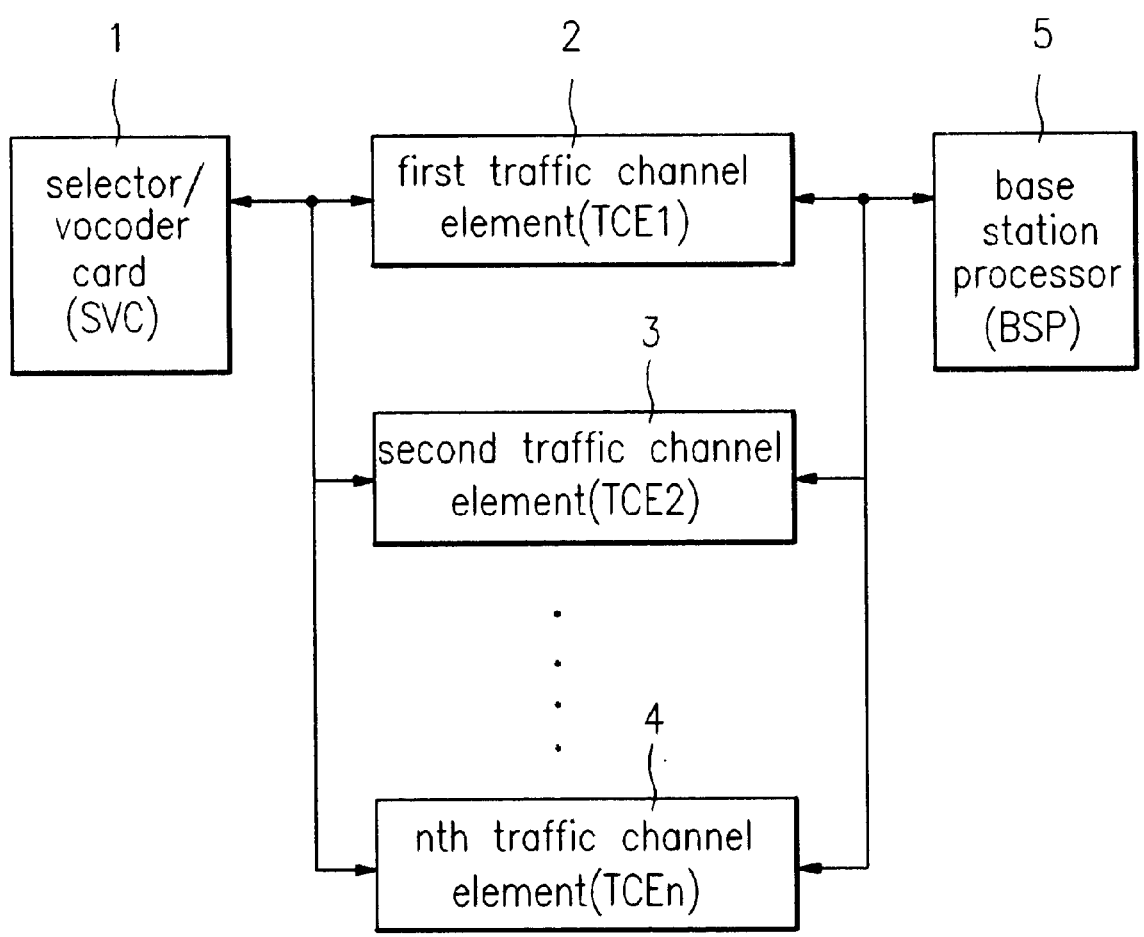
FIG. 1 is a block diagram of a base station which performs a cell capacity control method in the related art.
Figure 2:
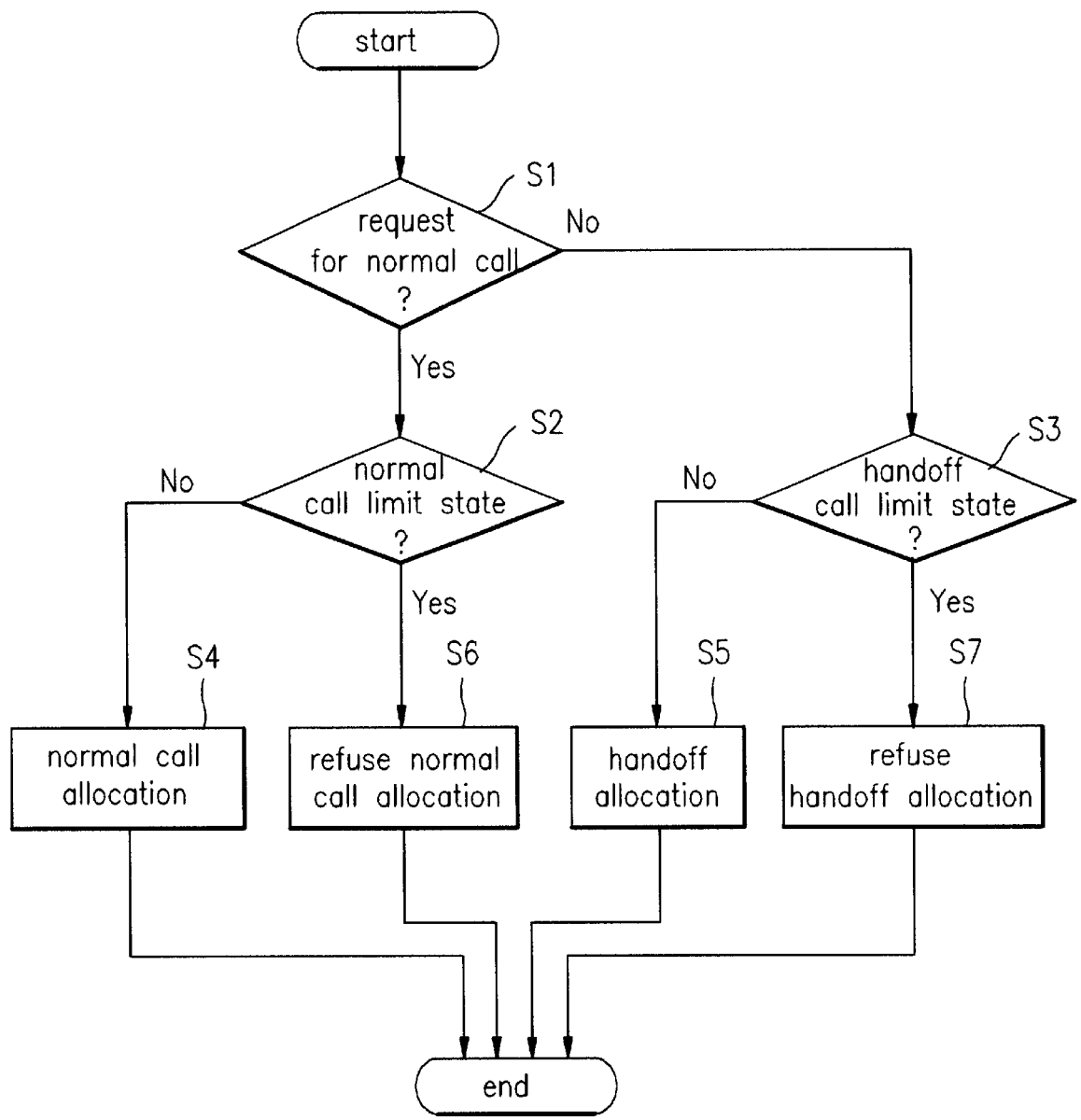
FIG. 2 is a flowchart illustrating the call processing method for the cell capacity control in the related art.
Figure 3:
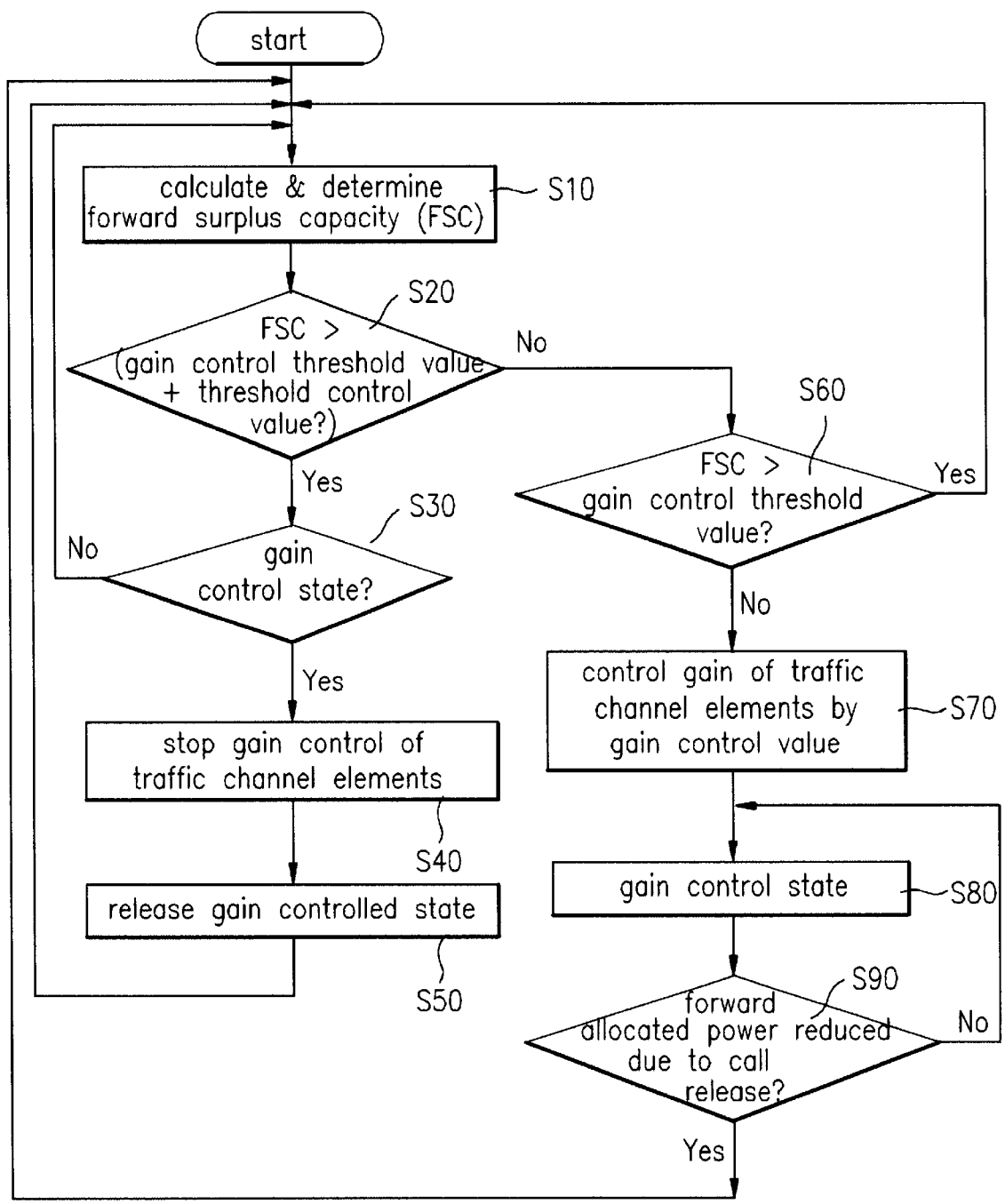
FIG. 3 is a flowchart illustrating a cell capacity increasing method according to the present invention.

FIG. 3 is a flowchart illustrating the cell capacity increasing method by a gain control of the traffic channels according to the present invention.

Referring to FIG. 3, a forward exess capacity (FEC) value is first calculated. Then, the forward exess capacity value is compared with the sum of the gain control threshold value and the threshold control value. Depending upon the results of the comparison, the allocated powers of the TCE may be uniformly reduced by a predetermined value. Accordingly, the transmission powers of all traffic channel elements in a cell are reduced and by maintaining the FEC value, the system enters a gain-controlled state thereby increasing the number of the traffic channels serviceable in the cell.

The FEC value (%) is determined by a current ratio of the pilot channel power to the total forward channel power. The total forward channel power is the sum of the traffic channel powers and powers for overhead channels such as a paging channel, pilot channel and synchronous channel. Assuming that the FEC value is 100% at no load, the FEC value decreases as the number of calls increases.

The gain control threshold value is a maximum value of the forward cell capacity at which incoming and outgoing calls can serviced by the base station without entering an overload state. The threshold control value is a marginal value of the gain control threshold value determined to prevent a ping-pong effect caused by an abrupt change of the forward exess capacity value near the gain control threshold value. The gain control threshold value and the threshold control value are determined by the base station operator.

Referring to FIG. 3, the cell capacity increasing method by the gain control of the traffic channels according to the present invention will next be explained. The BSP calculates and determines the FEC value from the ratio of the pilot channel power to the total forward channel power (SO). Then, the BSP compares the FEC value with the sum of the gain control threshold value and the threshold control value (S20).

The BSP judges whether the present state of the base station is already in a gain-controlled state if the FEC value is larger than the sum value (S30). If the present state is not judged to be in a gain-controlled state in step S30, the BSP is initialized to calculate and re-determine the forward exess capacity value from the ratio of the present pilot channel power to the total forward channel power.

If the present state is judged to be in a gain-controlled state in step S30, the BSP stops the gain control of TCEs by transmitting command messages to the TCEs (S40). Upon receiving the command messages, the TCEs stops executing gain control and utilizes the present channel powers allocated during the previous gain control as transmission powers. Relatively at the same time, the BSP exits the gain-controlled state (S50), and is initialized to calculate and re-determine the FEC value from the ratio of the present pilot channel power to the total forward channel power.

If the FEC value is not larger than the sum value in step S20, the BSP further compares the FEC value with the gain-control threshold value if the FEC value is not larger than the sum value (S60). If the FEC value is not larger than the gain control threshold value, the BSP uniformly reduces the powers of TCEs in a amount equivalent to a gain control value predetermined by the operator of the BSP (S70). As a result, the TCEs will be able to use the channel powers obtained from reducing the channel powers previously allocated by the gain control value. The gain control value should be determined such that the amount does not cause the TCEs allocated with the previous channel powers to operate abnormally. Thereafter, the TCEs of the base station enter a gain-controlled state (S80).

Moreover, the BSP may further check if any incoming or outgoing calls being serviced through the TCEs has been terminated or released during the gain-controlled state, and judges whether the forward allocated power has been reduced due to the call release (S90). At this time, if the forward allocated power has been reduced due to the call release, the BSP is initialized to calculate and re-determine the forward exess capacity value from the ratio of the present pilot channel power to the total forward channel power. However, if the forward allocated power has not been reduced, the TCEs are kept in the gain-controlled state (S80) and the BSP continues to check whether the forward allocated power has been reduced due to a call release (S90).

Thus, cell capacity can be increased by the gain control of traffic channels. In the cell capacity increasing method as described above, the BSP would continue to calculate and determine the FEC, and would judge whether to execute or stop the gain control. However, the cell capacity increasing method may be repeatedly executed in predetermined intervals, as decided by the operator of the base station. In such case, the FEC value would calculated in predetermined intervals and compared to the sum value. If the FEC value is not larger than the sum value and if the FEC value is not larger than the gain control threshold value, the BSP would initiate and execute a gain control. Otherwise, if the FEC value is larger than the sum value or if the FEC value is not larger than the gain control threshold value, the BSP would not execute the gain control. Accordingly, the BSP would enter or exit a gain-controlled state or continue the present state depending upon the process executed in the predetermined interval.

Furthermore, the step of comparing the FEC value to the sum of the gain control threshold value and threshold control value may be deleted to simply the cell capacity increasing process. Namely, the FEC value would be compared with the gain control threshold value upon calculating and determining the FEC value. Thereafter, if the FEC value is larger than the gain control value, the process would continue from step S30 and if the FEC is not larger than the gain control value, the process would continue from step S70.

In sum, by reducing the channel power of active traffic channel elements through gain control, the cell capacity increasing method according to the present invention can increase the cell capacity and allow more calls, including new calls and handoffs, to be allocated even when calls cannot be further allocated due to a decrease of the FEC value caused by a saturation of the forward channel powers.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A cell capacity increasing method of a base station comprising:
   (a) comparing a forward excess capacity ALEC) value of a base station to a gain control threshold value; and
   (b) controlling a traffic channel gain by uniformly reducing channel powers of traffic channel elements of the base station if the FEC is not larger than the gain control threshold value.

2. The method of claim 1, wherein the FEC value is determined by calculating a current ratio of a pilot channel power to a total forward channel power.

3. The method of claim 1, wherein the gain control threshold value is a predetermined maximum value of a forward cell capacity at which incoming and outgoing calls can serviced by the base station without entering an overload state.

4. The method of claim 1, wherein (a) and (b) are repeatedly executed in predetermined intervals.

5. The method of claim 1, further comprising checking whether the base station is in a gain-controlled state if the FEC is greater than the gain control threshold value, and stopping the controlling of a traffic channel gain to exit the gain-controlled state if the base station is in the gain-controlled state.

6. The method of claim 1, further comprising:
   (c) determining, after (b), whether a forward allocated power has been reduced, and repeating (a) and (b) if the forward allocated power has been reduced.

7. The method of claim 6, wherein in (c), determining whether the forward allocated power has been reduced by checking if any incoming or outgoing calls being serviced through the traffic channel elements has been released during a gain-controlled state.

8. The method of claim 1, further comprising:
   (c) comparing the FEC value to a sum of the gain control threshold value and a threshold control value, and wherein executing(b) if the FEC value is not larger than said sum.

9. The method of claim 8, wherein the threshold control value is a predetermined marginal value of the gain control threshold value determined to prevent a ping-pong effect.

10. The method of claim 8, wherein (a), (b) and (c) are repeatedly executed in predetermined intervals.

11. The method of claim 8, further comprising checking whether the base station is in a gain-controlled state if the FEC is greater than the gain control threshold value, and stopping the controlling of a traffic channel gain to exit the gain-controlled state if the base station is in the gain-controlled state.

12. The method of claim 8, further comprising:
(d) determining, after (b), whether a forward allocated power has been reduced, and repeating (a), (b) and (c) if the forward allocated power has been reduced.

13. The method of claim 12, wherein in(d), determining whether the forward allocated power has been reduced by checking if any incoming or outgoing calls being serviced through the traffic channel elements has been released during a gain-controlled state.

14. A cell capacity increasing method of a base station, comprising:
(a) comparing a forward excess capacity (FEC) value of a base station to a sum of a gain control threshold value and a threshold control value;
(b) comparing the FEC value to the gain control threshold if the FEC value is not larger than said sum value;
(c) controlling a traffic channel gain by uniformly reducing channel powers of traffic channel elements of the base station if the FEC is not larger than the gain control threshold value;
(d) checking whether the base station is in a gain-controlled state if the FEC is greater than the gain control threshold value, and stopping the controlling of a traffic channel gain to exit the gain-controlled state if the base station is in the gain-controlled state; and
(e) determining, after (b), whether a forward allocated power has been reduced, and repeating (a) through (d) if the forward allocated power has been reduced.

15. The method of claim 14, wherein the FEC value is determined by calculating a current ratio of a pilot channel power to a total forward channel power.

16. The method of claim 14, wherein the gain control threshold value is a predetermined maximum value of a forward cell capacity at which incoming and outgoing calls can serviced by the base station without entering an overload state.

17. The method of claim 14, wherein the threshold control value is a predetermined marginal value of the gain control threshold value determined to prevent a ping-pong effect.

18. The method of claim 14, wherein in (e), determining whether the forward allocated power has been reduced by checking if any incoming or outgoing calls being serviced through the traffic channel elements has been released during a gain-controlled state.

19. The method of claim 1, wherein controlling the traffic channel gain is performed by uniformly reducing channel powers of all traffic channel elements of the base station if the FEC is not larger than the gain control threshold value.

20. The method of claim 1, wherein the cell capacity of the base station is controlled by the base station, and wherein the cell capacity of the base station is controlled independently of other base stations in a network to which the base station belongs.

21. The method of claim 2, wherein the total forward power comprises the sum of traffic channel powers and overhead channel powers.

22. The method of claim 14, wherein controlling the traffic channel gain is performed by uniformly reducing channel powers of all traffic channel elements of the base station if the FEC is not larger than the gain control threshold value.

23. The method of claim 14, wherein the cell capacity of the base station is controlled by the base station, and wherein the cell capacity of the base station is controlled independently of other base stations in a network to which the base station belongs.

24. The method of claim 15, wherein the total forward power comprises the sum of traffic channel powers and overhead channel powers.

25. A base station in a mobile communication system, comprising:
a plurality of traffic channel elements;
a selector/vocoder card (SVC) to allocate traffic channel powers to the plurality of traffic channel elements and process voice data; and
a base station processor ASP) to calculate forward powers of respective sectors of the base station using the traffic channel powers reported by the traffic channel elements, wherein the BSP compares a forward excess capacity (FEC) value of the base station to a gain control threshold value, and controls a traffic channel gain by uniformly reducing channel powers of all traffic channel elements of the base station if the FEC value is not larger than the gain control threshold value.

26. The base station of claim 25, wherein the BSC calculates the FEC value by determining a current ratio of a pilot channel power to a total forward channel power.

27. The base station of claim 26, wherein the total forward power comprises the sum of traffic channel powers and overhead channel powers.

28. The base station of claim 26, wherein the cell capacity of the base station is controlled by the base station, and wherein the cell capacity of the base station is controlled independently of other base stations in a network to which the base station belongs.

* * * * *